United States Patent [19]

Upadhyayula

[11] 4,399,439
[45] Aug. 16, 1983

[54] SIGNAL SWITCHING MATRIX

[75] Inventor: Lakshminarashimha C. Upadhyayula, East Windsor, N.J.

[73] Assignee: RCA Corporation, New York, N.Y.

[21] Appl. No.: 324,027

[22] Filed: Nov. 23, 1981

[51] Int. Cl.³ .................. H04Q 9/00; H03K 11/60
[52] U.S. Cl. ........................ 340/825.91; 330/124 R; 333/101
[58] Field of Search ............... 340/825.91, 825.02; 307/251; 333/100, 101; 330/124 R; 179/18.6 F

[56] References Cited
U.S. PATENT DOCUMENTS

| | | | |
|---|---|---|---|
| 3,891,815 | 6/1975 | Hiele | 340/825.79 |
| 4,149,096 | 4/1979 | Holzner et al. | 340/825.79 |
| 4,317,110 | 2/1982 | Hsu | 340/825.91 |

Primary Examiner—Donald J. Yusko
Attorney, Agent, or Firm—J. S. Tripoli; R. L. Troike; R. E. Smiley

[57] ABSTRACT

An M by N switch matrix includes N input switches each single-pole M-throw, M output switches each N-throw single-pole with the N*M outputs of the N input switches coupled directly to respective ones of the N*M inputs of the M output switches whereby a signal applied at any of the N input switches can be coupled to the output of any one of the M output switches. The switches may consist of a plurality of dual-gate field effect transistors enabling the switching matrix to be utilized at microwave frequencies.

12 Claims, 5 Drawing Figures

SIGNAL SWITCHING MATRIX

This invention is concerned with a switching matrix and more particularly to such matrix for use at microwave frequencies.

Prior art switch matrices, particularly for use at microwave frequencies, typically employ appropriate switching elements located at the various crosspoints of the matrix. U.S. Pat. No. 3,833,866, issued Sept. 3, 1974, to P. Boutelant is one such example. It employs PIN diodes located at each crosspoint and power dividers to divide the incoming signal to each of the crosspoints and power combiners to combine the signal from the crosspoints to the output terminals. Such systems are relatively lossy, have relatively slow switching speeds, are not suitable for large numbers of inputs and outputs and are not readily suitable for integration.

In accordance with a preferred embodiment of the present invention, an M by N matrix comprises N single-pole, M-throw input switches from N input signal lines, M N-throw single pole output switches connected to M output signal lines and M*N hardwired crosspoints at the connections to the M*N outputs of said input switches and M*N inputs of said output switches where * is a multiplication symbol.

Figure 1:
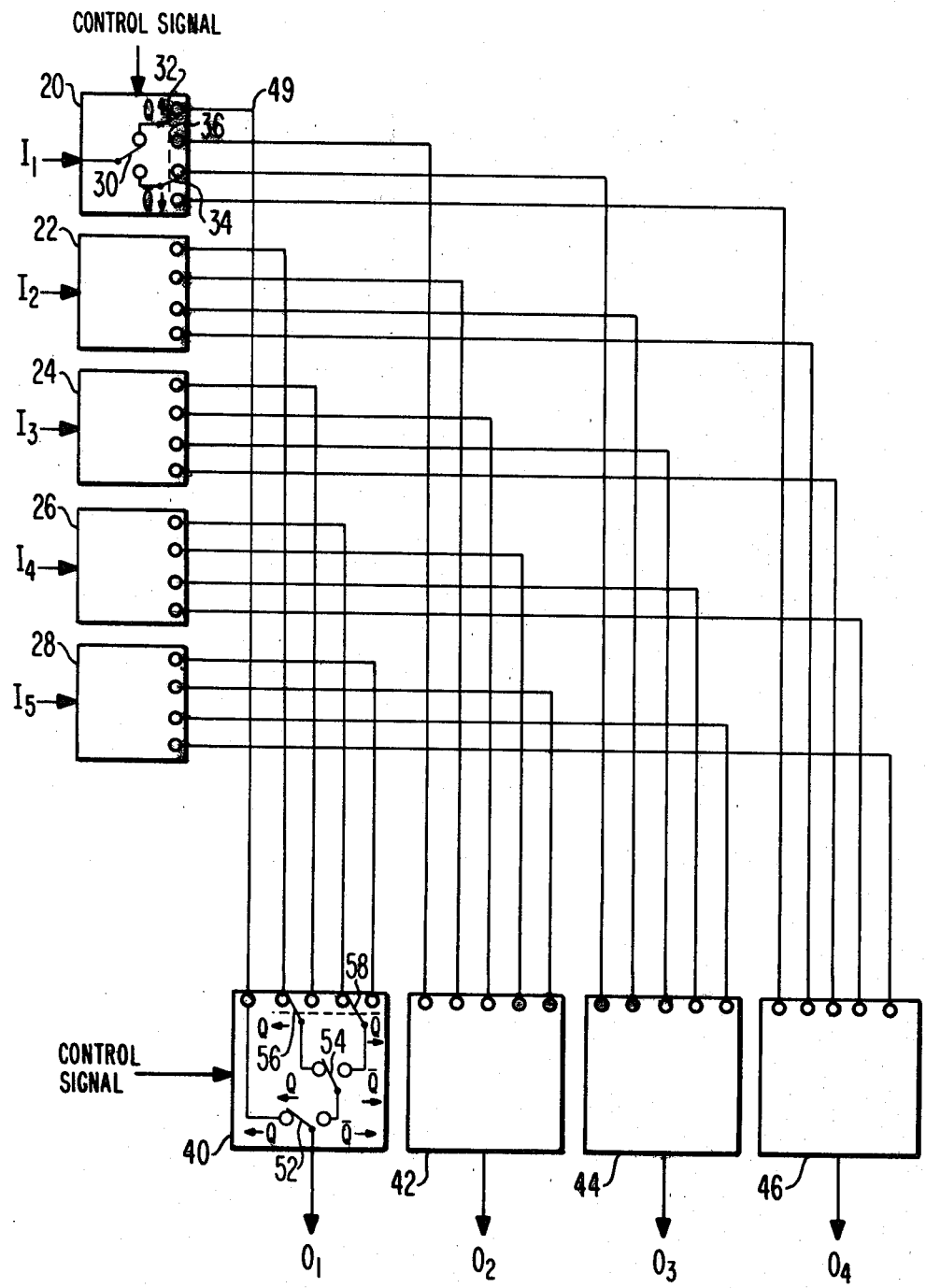
FIG. 1 is a schematic diagram of a switch matrix in accordance with a preferred embodiment of the present invention.

FIG. 1 illustrates a 5 by 4 switching matrix as being exemplary of the invention. Any of 5 input lines labeled $I_1$, $I_2$, $I_3$, $I_4$ and $I_5$ can be electrically connected to any of 4 output lines $O_1$, $O_2$, $O_3$ and $O_4$ while any three of the remaining input lines can be connected to respective ones of the 3 remaining output lines. The numerals 5 and 4 are arbitrary and can be of any practical size. Furthermore, the number of input lines may be identical to or different from the number of output lines.

The 5 input lines $I_1$, $I_2$, $I_3$, $I_4$ and $I_5$ are coupled to blocks 20, 22, 24, 26 and 28, respectively. The four output lines $O_1$, $O_2$, $O_3$ and $O_4$ are coupled from blocks 40, 42, 44 and 46.

Within each of blocks 20, 22, 24, 26 and 28 is the equivalent of a single-pole four-throw (SP4T) switch. In block 20 the SP4T switch is illustrated as being comprised of three SP2T switches 30, 32 and 34 which are positioned under control of a control signal from a source (not shown). Each of the other blocks 22, 24, 26, and 28 has an identical switch arrangement but different control signals from a source (not shown) to control different positions of the different switches. The dashed line 36 connecting switches 32 and 34 indicates that these switches are operated in parallel by means to be illustrated in connection with FIG. 2. The significance of the letters "Q" and "$\overline{Q}$" and associated arrows will be described hereinafter.

Similarly, within each of blocks 40, 42, 44 and 46 is the equivalent of a five-throw single-pole (5TSP) switch. In block 40 the 5TSP switch is illustrated as comprising four 2TSP switches 52, 54, 56 and 58 which are positioned under control of a control signal from a source (not shown). The other blocks 42, 44 and 46 contain identical switch arrangements but different control signals from a source (not shown). These switches usually would be termed SP2T switches but since one embodiment of the invention utilizes solid state switches, such as 20, which differ materially from switches such as 40, a different term describing the two types of switches is desirable. Thus, in general, switch 20 is termed a SPNT while switch 40 is termed a MTSP where M may be $<=>N$ and where M and N are integers $>0$.

The outputs of the input switches 20, 22, 24, 26 and 28 are tied to the inputs of the output switches 40, 42, 44 and 46 via what are termed crosspoints, crosspoint 49 being an example thereof. Unlike the prior art, crosspoint 49 is simply a point along the wire connecting between switch 20 and switch 40. As illustrated in FIG. 1, all outputs from input switch 20 are tied to one input of each of the output switches. Similarly, the respective outputs of switches 22, 24, 26 and 28 are tied to other sets of inputs of respective output switches 40, 42, 44 and 46.

As illustrated in FIG. 1, if the switches in input switch 20 and output switch 40 are positioned as shown (under control of the control signal) then input $I_1$ is tied to output $O_1$. Similarly, by properly positioning other switches, as many as 3 of the 4 remaining inputs can be coupled to as many as desired of the remaining 3 outputs in any order.

Figure 2:
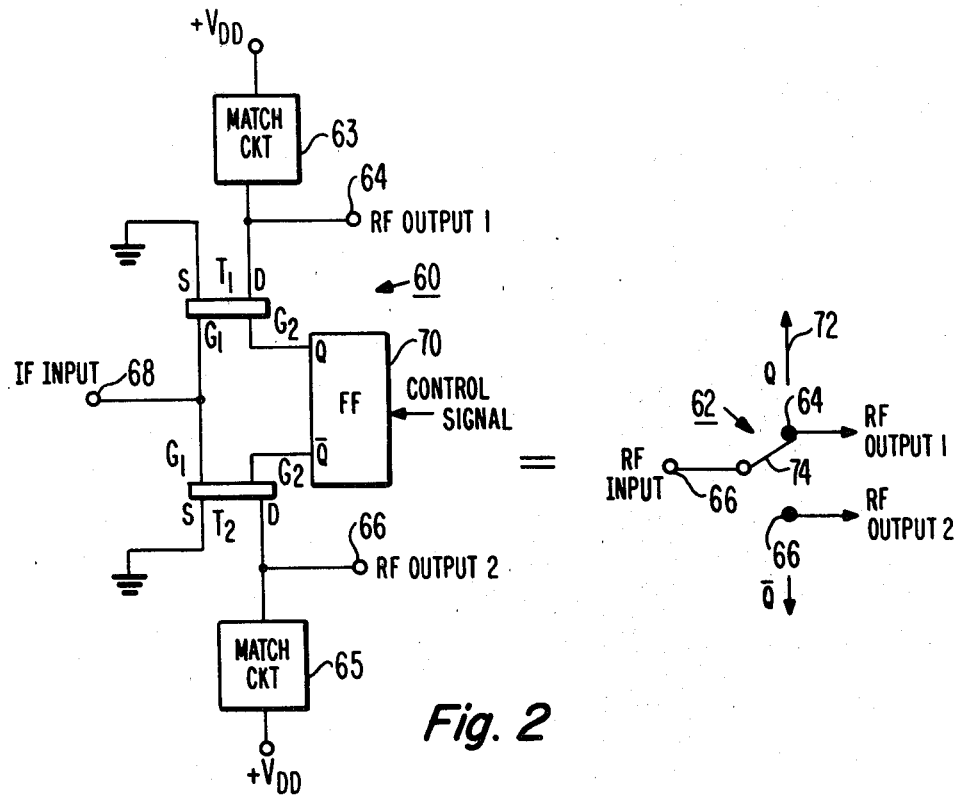
FIG. 2 is a circuit in schematic diagram form of a dual-gate GaAs MESFET single-pole double-throw switch used as a switching element of the FIG. 1 matrix.

With reference next to FIG. 2 a solid state SP2T input switch 60 useful at microwave frequencies is shown along with its equivalent mechanical switch 62. Switch 60 is comprised of two dual-gate gallium arsenide (GaAs) MESFET N channel transistors $T_1$ and $T_2$. The sources (S) are connected to circuit ground. The drains (D) are separately connected through suitable conventional matching circuits 63 and 65 to a suitable bias potential $+V_{DD}$. In addition, the drain of transistor $T_1$ is connected to a first output terminal 64 of the switch and the drain of transistor $T_2$ is connected to a second output terminal 66 of the switch. The signal gates, usually $G_1$, of both transistors are connected together and to switch input terminal 68. The other gates, usually termed control gates and usually $G_2$, of transistors $T_1$ and $T_2$ are connected to the Q and $\overline{Q}$ output terminals, respectively, of flip-flop 70. A control signal is applied to flip-flop 70 from a source (not shown). If the flip-flop is set such that the Q terminal is a logic 1 (a relatively high level signal), transistor $T_2$ is rendered nonconductive by the relatively low level signal from $\overline{Q}$ and transistor $T_1$ is rendered conductive to pass any signals applied at input terminal 68 to output terminal 64. Conversely, if the flip-flop is reset such that the $\overline{Q}$ terminal is at a logic 1, transistor $T_1$ is rendered nonconductive and transistor $T_2$ is rendered conductive passing signals applied at input terminal 68 to output terminal 66.

By proper choice of control gate bias and drain bias the dual-gate MESFET switch will provide slight gain to signals passing therethrough rather than a signal loss associated with conventional switches.

In equivalent switch 62 the letter Q and upward pointing arrow 72 near terminal 64 indicates that when Q is a logic 1 the switch arm 74 is positioned upward as illustrated. A circuit 60, FIG. 2, is substituted for each SP2T switch in the input switches of FIG. 1. The flip-flops or the switch circuits of FIG. 2 that replace switches 32 and 34, FIG. 1, are tied together or are replaced by one flip-flop such that transistor $T_1$ of both switches are enabled together and transistor $T_2$ of both switches are enabled together.

Figure 3:
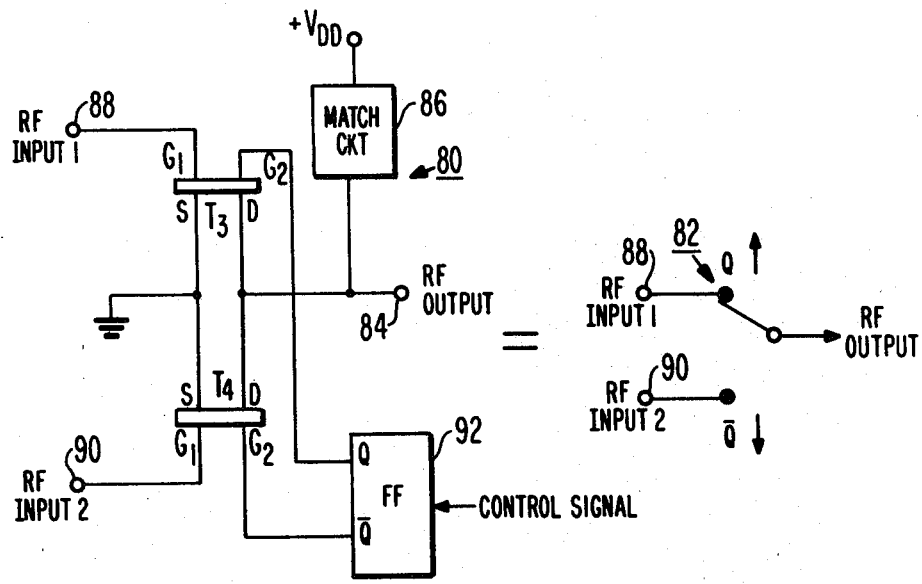
FIG. 3 is a circuit in schematic diagram form of a dual-gate GaAs MESFET double-throw single-pole switch used as a switching element in the output circuit of FIG. 1.

With reference next to FIG. 3, a solid state 2TSP output switch 80 useful at microwave frequencies is shown along with its equivalent mechanical switch 82. Switch 80 comprises two dual-gate GaAs MESFET transistors $T_3$ and $T_4$. The sources (S) are each connected to circuit ground. The drains (D) are connected together and connected to an output terminal 84. The drains are also connected through a suitable conventional matching circuit 86 to a suitable bias potential $+V_{DD}$. The signal gate $G_1$ of transistor $T_3$ is connected to switch input terminal 88 while the signal gate $G_1$ of transistor $T_4$ is connected to a switch input terminal 90. Gate $G_2$ of transistor $T_3$ is connected to the Q output of a flip-flop 92 while gate $G_2$ of transistor $T_4$ is connected to the $\overline{Q}$ output of flip-flop 92. The state of flip-flop 92 is determined by a control signal applied thereto from a source (not shown). The letters Q and $\overline{Q}$ and upward and downward pointing arrows in connection with the equivalent mechanical switch 82 have the same meaning as with switch 62 of FIG. 2. A switch circuit 80, FIG. 3, is substituted for each 2TSP switch in the output switches of FIG. 1. As with the input switches, the flip-flops of those electronic switches which substitute for mechanical switches 66 and 68 are tied together. Also, as with the switch of FIG. 2, gain is possible.

Although transistor failure is unlikely, one or both of the transistors in a switch may possibly fail. If they fail, they will most likely fail in the open position.

Figure 4:
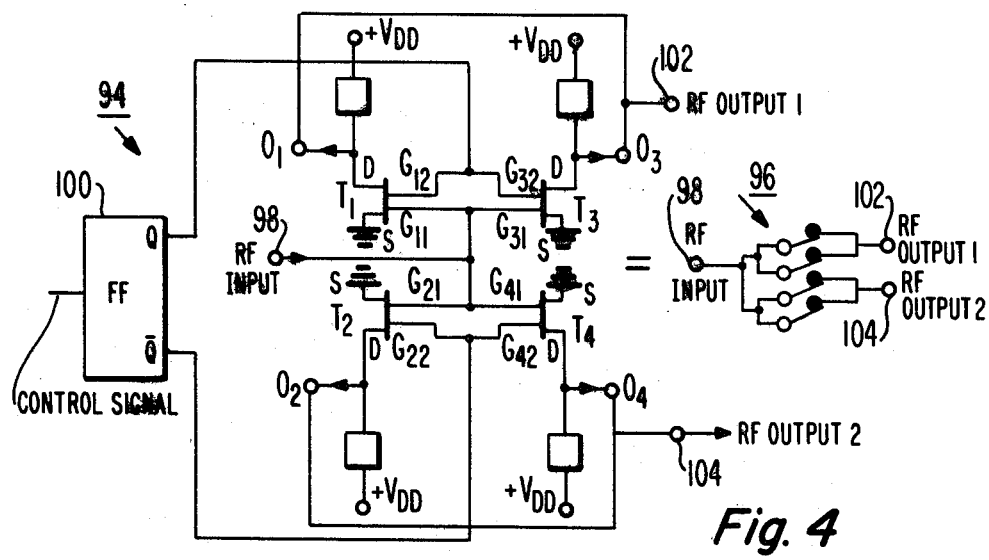
FIG. 4 is a circuit schematic diagram form of a single-pole four-throw switch used as a substitute for the switch of FIG. 2 for redundancy.

FIG. 4, to which attention is now directed, illustrates a fully redundant SP4T switch which is connected in a manner to provide complete redundancy as an SP2T switch. SP4T switch 94 has an equivalent circuit mechanical switch 96 as illustrated to the right of switch 94. Switch 94 comprises four GaAs MESFET transistors $T_1$, $T_2$, $T_3$ and $T_4$. It should be noted that the transistor designations in FIG. 4 bear to direct relationship to those similar transistor designations in FIGS. 2 and 3. The sources of all transistors $T_1$, $T_2$, $T_3$ and $T_4$ of FIG. 4 are connected to circuit ground. The drains of each transistor of FIG. 4 is connected to an associated output terminal, such output terminals being labeled $O_1$, $O_2$, $O_3$ and $O_4$, respectively.

The signal gates of all transistors of FIG. 4 are connected together and to an RF input terminal 98. The second gates $G_{12}$ and $G_{32}$, of transistors $T_1$ and $T_3$ respectively, are connected together and to the $\overline{Q}$ terminal of a flip-flop 100. Similarly, the second gates $G_{22}$ and $G_{42}$ of transistors $T_2$ and $T_4$, respectively, are connected together and to the Q terminal of flip-flop 100. As with previous switch circuits, a control signal from a source, not shown, is coupled to flip-flop 100 to control the state thereof. To provide for complete redundancy, outputs $O_1$ and $O_3$ are connected together to a switch output terminal 102 while output terminals $O_2$ and $O_4$ are connected together to a switch output terminal 104. As in FIG. 2, signals presented at input terminal 98 are passed either to output terminal 102 or output terminal 104 depending on the setting of flip-flop 100.

It will be realized that additional circuitry (not shown) may be provided to render only one of transistors $T_1$ and $T_3$ or one of transistors $T_2$ and $T_4$ conductive at once upon detection of failure of the other transistor of the pair. This arrangement saves dc power and provides better RF match in the drain circuit.

Figure 5:
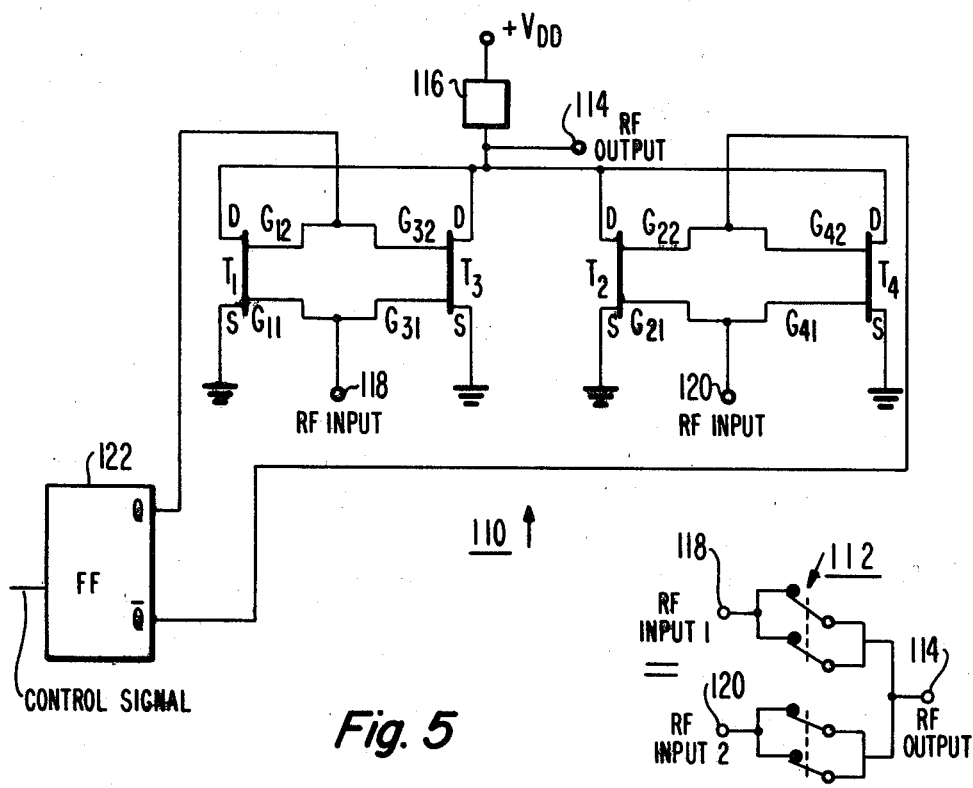
FIG. 5 is a circuit schematic diagram form of a four-throw single-pole switch used as substitute for the switch of FIG. 3 for redundancy.

FIG. 5, to which attention is now directed, illustrates a fully redundant 4TSP switch which is connected in a manner to provide complete redundancy as an 2TSP switch. 4TSP switch 110 has an equivalent circuit mechanical switch 112 as illustrated to the right of switch 110. Switch 110 comprises four GaAs MESFET transistors $T_1$, $T_2$, $T_3$ and $T_4$. It should be noted that the transistor designations in FIG. 5 bear no direct relationship to those similar transistor designations in FIGS. 2, 3 and 4. The sources of all transistors in FIG. 5 are connected to circuit ground. The drains of all transistors in FIG. 5 are connected to a common output terminal 114 and via a matching circuit 116 to bias source $+V_{DD}$.

The signal gates $G_{11}$ and $G_{31}$ of transistors $T_1$ and $T_3$ of FIG. 5 are connected together and to an RF input terminal 118. Similarly, the signal gates $G_{21}$ and $G_{41}$ of transistor $T_2$ and $T_4$ of FIG. 5 are connected together and to an RF input terminal 120. The second gates $G_{12}$ and $G_{32}$ of transistors $T_1$ and $T_3$, respectively, are connected together and to the Q terminal of a flip-flop 122. Similarly, the second gates $G_{22}$ and $G_{42}$ of transistors $T_2$ and $T_4$, respectively, are connected together and to the $\overline{Q}$ terminal of flip-flop 122. As with previous switch circuits, a control signal from a source, not shown, is coupled to flip-flop 122 to control the state thereof. As in FIG. 3, signals presented at input terminal 118 or input terminal 120 are passed to output terminal 114 depending on the setting of flip-flop 122.

What is claimed is:

1. An M by N signal switching matrix for coupling various ones of N input lines to various ones of M output lines comprising in combination:

N single-pole, M-throw input switches coupled to said N input lines where each of said switches has M outputs;

M N-throw, single-pole output switches coupled to said M output lines where each of said output switches has N inputs;

M*N connections between respective ones of the M outputs of the N input switches and respective ones of N inputs to the M output switches where M and N are integers, $M <=> N$ and * is the multiplication symbol.

2. The combination as set forth in claim 1 wherein each said input switch comprises a plurality of single-pole two-throw switches positioned to connect the input thereto to any one of the M outputs thereof.

3. The combination as set forth in claim 1 wherein each output switch comprises a plurality of two-throw single-pole switches arranged to connect the N inputs thereto to an output line thereof.

4. The combination as set forth in claim 2 wherein each output switch comprises a plurality of two-throw single-pole switches arranged to connect the N inputs thereto to an output line thereof.

5. The combination as set forth in claim 3 wherein each said input switch comprises a plurality of single-pole two-throw switches arranged to connect the input thereto to any one of the M outputs thereof.

6. The combination as set forth in either claim 3 or 4 wherein said two-throw single-pole switch comprises a pair of dual-gate FET transistors.

7. The combination as set forth in claim 6 wherein the input of said single-pole two-throw switch is connected to the signal gates of said two transistors, the source and drain of one of said transistors coupled between circuit ground and the output of the switch and the source and drain of the other transistor are connected between circuit ground and the other output of the said switch.

8. The combination as set forth in claim 7 wherein the control gates of said first transistors are coupled to receive mutually exclusive control signals such that only one of the transistors is enabled at a time.

9. The combination as set forth in claim 8 wherein the source and drains of said two transistors are coupled together respectively and wherein said sources and drains are connected between circuit ground and the output of said switch and wherein the inputs to said switch are coupled to the signal gates respectively of said two transistors.

10. The combination as set forth in claim 9 wherein the mutually exclusive control signals are coupled to the control gates of said two transistors such that only one transistor is enabled at a time to pass the signal applied to its signal gate to the switch output.

11. The combination as set forth in either claim 2 or claim 5 wherein said single-pole two-throw switch comprises first and second pairs of dual-gate FET transistors, each transistor having a signal input gate, a control input gate, a source and a drain.

12. The combination as set forth in claim 11 wherein the sources and drains of said first pair of transistors are coupled between circuit ground and one of the switch outputs, wherein the sources and drains of said second pair of transistors are coupled respectively together between the circuit ground and a second output of said switch, wherein the signal gates of all four of said first and second pair of transistors are coupled together to the input of said switch wherein the control gates of said first pair of transistors are coupled together and wherein the control gates of said second pair of transistors are coupled together and coupled respectively to receive mutually exclusive control signals thereat such that only one pair of transistors is conductive at one time to pass the input signal applied thereto to the output thereof associated with the conductive pair of transistors.

* * * * *

UNITED STATES PATENT AND TRADEMARK OFFICE
CERTIFICATE OF CORRECTION

PATENT NO. : 4,399,439

DATED : August 16, 1983

INVENTOR(S) : L. C. Upadhyayula

It is certified that error appears in the above-identified patent and that said Letters Patent is hereby corrected as shown below:

Column 3, line 56, change "$\overline{Q}$" to --Q--.

line 59, change "Q" to --$\overline{Q}$--.

On the Cover Sheet, under References Cited,
U.S. Patent Documents, add the following:

| | | | |
|---|---|---|---|
| 3,781,806 | 12/73 | Mizushima et al. | 340/166R |
| 3,819,867 | 6/74 | McCarthy et al. | 179/18GF |
| 3,833,866 | 9/74 | Boutelant | 333/7D |

Signed and Sealed this

Eighth Day of November 1983

[SEAL]

Attest:

GERALD J. MOSSINGHOFF

Attesting Officer  Commissioner of Patents and Trademarks